US008456104B2

(12) United States Patent
Allard et al.

(10) Patent No.: US 8,456,104 B2
(45) Date of Patent: Jun. 4, 2013

(54) VARIABLE BACKLIGHT CONTROL FOR BEZEL

(75) Inventors: Rika Allard, San Diego, CA (US); Peter Shintani, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 901 days.

(21) Appl. No.: 12/200,294

(22) Filed: Aug. 28, 2008

(65) Prior Publication Data

US 2010/0052548 A1    Mar. 4, 2010

(51) Int. Cl.
*H04N 9/30* (2006.01)
*G06F 3/038* (2006.01)

(52) U.S. Cl.
USPC ............................ 315/294; 345/204; 348/802

(58) Field of Classification Search
USPC ... 315/291, 293, 294; 345/102, 204; 348/177, 348/179, 687, 799, 798, 832, 802; 362/97.4
See application file for complete search history.

(56) References Cited

U.S. PATENT DOCUMENTS

| | | | | |
|---|---|---|---|---|
| 3,270,451 | A * | 9/1966 | Bartleson et al. | 40/563 |
| 6,339,429 | B1 * | 1/2002 | Schug | 345/589 |
| 6,519,140 | B1 | 2/2003 | Kim et al. | |
| 6,778,226 | B1 * | 8/2004 | Eshelman et al. | 348/836 |
| 7,038,398 | B1 | 5/2006 | Lys et al. | |
| 7,064,498 | B2 | 6/2006 | Dowling et al. | |
| 7,616,262 | B2 * | 11/2009 | Eves et al. | 348/553 |
| 7,864,204 | B2 * | 1/2011 | Overes | 345/102 |
| 2005/0206788 | A1 * | 9/2005 | Eves et al. | 348/602 |
| 2006/0209527 | A1 * | 9/2006 | Shin | 362/29 |
| 2009/0289874 | A1 * | 11/2009 | Ha | 345/1.3 |
| 2010/0053229 | A1 * | 3/2010 | Krijn et al. | 345/690 |
| 2011/0018462 | A1 * | 1/2011 | Lowe et al. | 315/294 |
| 2011/0018849 | A1 * | 1/2011 | Lowe et al. | 345/205 |

FOREIGN PATENT DOCUMENTS

| | | | |
|---|---|---|---|
| EP | 1551178 A1 | * | 7/2005 |
| KR | 10-2007-0108042 | | 11/2007 |
| KR | 10-2008-0022886 | | 3/2008 |
| WO | WO 2006059263 A1 | * | 6/2006 |

OTHER PUBLICATIONS

Phillips Ambilight, Philips Aurea, the Luxury Ambilight, http://gizmodo.com/gadgets/glowy-goodness/philips-aurea-the-luxury-ambilight-287722.php, Aug. 9, 2007.
Allard, PCT ISR and Written Opinion, PCT Appl. No. PCT/US2009/055908, KIPO, Apr. 2, 2010.

* cited by examiner

*Primary Examiner* — Douglas W Owens
*Assistant Examiner* — Amy Yang
(74) *Attorney, Agent, or Firm* — Sony Corporation (57) ABSTRACT

A method and system provide for dynamic control of backlighting of a light-transmissive bezel of a display device. A color control signal is received and processed by a processor and control element of the display device to generate a backlighting control signal and transmit the backlighting control signal to the backlighting element of the display device. The backlighting element generates a backlighting color to illuminate the light-transmissive bezel in accordance with the received backlighting control signal; the backlighting control signal adaptively controls the type and the duration of the backlighting color as determined by the color control signal received by the processor and control element.

31 Claims, 7 Drawing Sheets

VARIABLE BACKLIGHT CONTROL FOR BEZEL

COPYRIGHT NOTICE

A portion of the disclosure of this patent document may contain material that is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

It is becoming increasingly common for a user of a large display device, such as a flat screen television or monitor, to mount the display device on a wall or other suitable viewing surface. When a display device is mounted on a mounting surface, such as a wall for example, the display device may in fact dominate the appearance of the wall given its large size. In addition, the color of the bezel, the border around the perimeter of the display device that frames the display screen itself, as well as the color of the image being displayed by the display device commonly are not aesthetically pleasing in combination with the mounting surface. The bezel may have a color that does not match or mix well with either the image being displayed or the color of the mounting surface.

Changing out the bezel from the original display device bezel is an attempt to make the display device more attractive in its chosen environment. The purchaser may only be able to select from a very limited offering of bezels having fixed colors. The restricted color choices may or may not be sufficient to provide the user with a pleasing color combination.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with various embodiments of the present invention, a method and system provide for dynamic control of backlighting of a light-transmissive bezel of a display device. A color control signal is received and processed by a processor and control element of the display device to generate a backlighting control signal and transmit the backlighting control signal to the backlighting element of the display device. The backlighting element generates a backlighting color to illuminate (backlight) the light-transmissive bezel in accordance with the received backlighting control signal; the backlighting control signal adaptively controls the type and the duration of the backlighting color as determined by the color control signal received by the processor and control element. The backlighting color may be dynamically and adaptively controlled by making the color control signal used to define the backlighting color flexibly defined by conditions such as the color of an environmental feature, the time of day, the time of year, the date, the primary display color of an image being displayed by the display device or by user definition through interaction of a user with a user interface to selectively define the color control signal. The backlighting color may be made to track a color or to be the opposite of the dominate color of the image being displayed; this would clearly help enhance the contrast seen by a viewer of the display device.

With regard to the color of an environmental feature, such as the color of a wall, it is possible for a viewer to enter the room color data into the display device (such as a television) via a user interface of a remote controller, a panel at the display device itself, or a user interface of another system device, such as a sensor device. The display device can then go through its internal database or access a paint color database via an Internet connection. Most people paint or repaint their rooms, and many may have the can of paint with the color information available to be input as room color data into the user interface.

The color control signal may be generated from a sensed color of an environmental feature of an environment in which the display device resides; a sensor device such as a digital camera may be used to sense the color of the environmental feature, for instance, a door, wall or ceiling proximate the display device. The use of a sensed environmental color allows the color control signal to adaptively control the backlighting color of the light-transmissive bezel in response to the sensed color. For example, the color control signal may adaptively control the backlighting color to approximate the sensed color of the environmental feature.

Moreover, the color control signal may be in part determined by a primary display color of an image displayed on a display screen of the display device as well as the sensed color of the environmental feature; the primary display color may be detected by monitoring a video signal displayed by the display screen of the display device. In this case, the color control signal may be generated from the sensed color of the environmental feature and the detected primary display color of the image displayed by the processor and control element of the display device. The backlighting color, then, may be adaptively controlled response to the color control signal generated from the sensed color of the environmental feature and the detected primary color of the image displayed.

Knowledge of both the detected primary color of the image as well as the sensed environmental color provides great flexibility in controlling the backlighting color. For example, the backlighting color may be adaptively controlled to maximize contrast between the backlighting color and the sensed primary display color; to minimize contrast between the backlighting color and the sensed primary display color; to maximize contrast between the sensed primary display color and the sensed color of the environmental feature; and to minimize contrast between the sensed primary display color and the sensed color of the environmental feature.

The color control signal may also be dynamically controlled by a user via a user interface of a device such as a remote control device or a sensor or sensing device, such as a digital camera. In this manner, the user can dynamically control the color control signal and thus the backlighting color of the bezel via the user interface. In the case of a sensing device, the sensor may sense a color of an environmental feature of an environment in which the display device is proximate; a remote controller having a user interface by which a user may remotely control operation of the sensor may be used.

Figure 1:
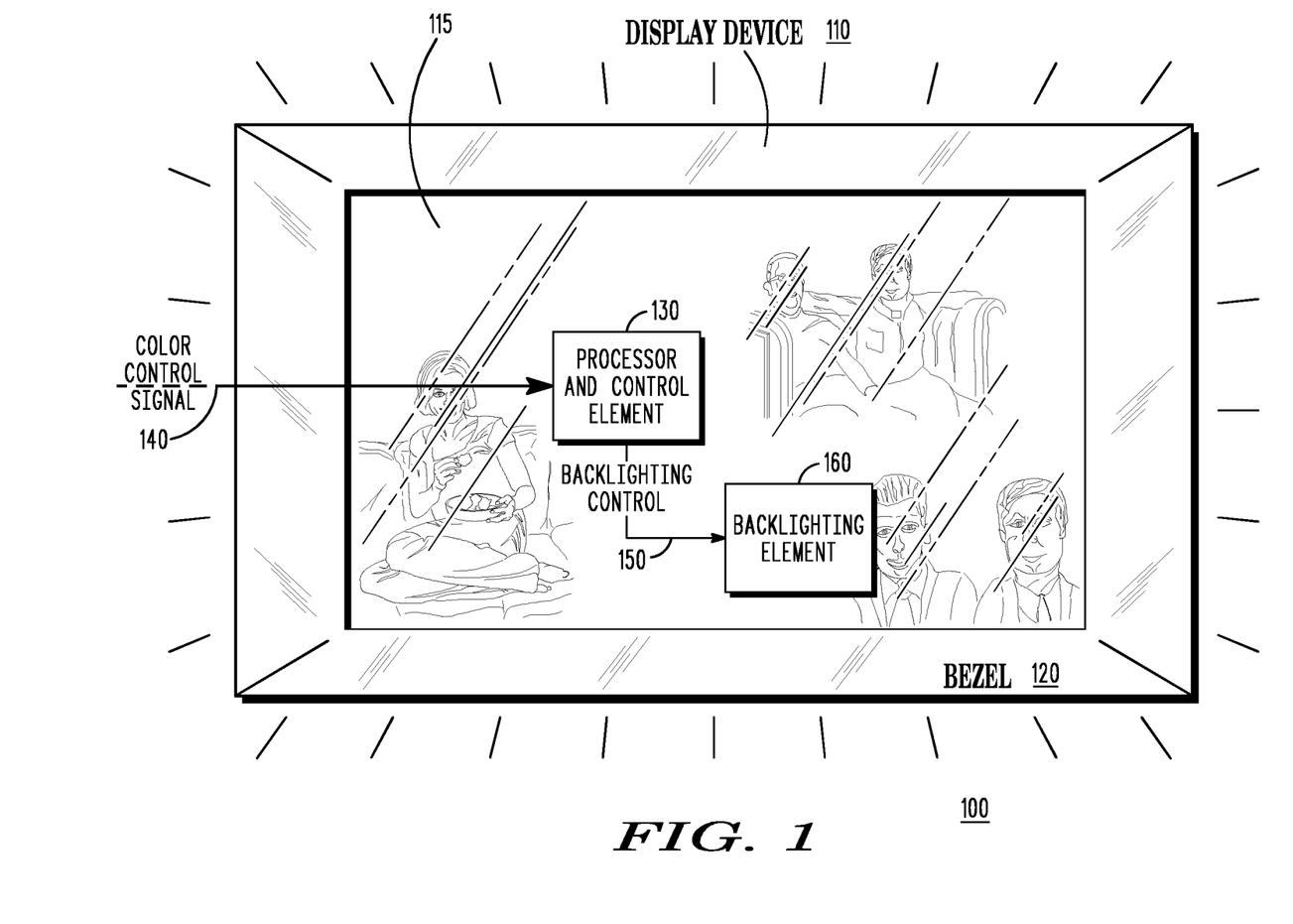
FIG. 1 is a functional block diagram of a display device system, in accordance with various embodiments.

Referring now to FIG. 1, a functional system block diagram 100 is illustrated. Display device 110 has a light-transmissive bezel 120 around the perimeter of the display device 120, surrounding a display screen area 115 suitable for displaying images on the screen, such as television, cable or satellite television programming, video and interactive games, programming for a personal digital assistant (PDA), other applications or programming, etc. The display device, then, may serve as the display or monitor for a television set, including a HDTV, a flat-screen television set, a computer monitor, a PDA screen. The light-transmissive bezel is of a light-transmissive material, such as a transparent, translucent, semi-transparent, opaque or other material that allows some light to shine through it. This backlighting is generated by backlighting element 160 under control of the backlighting control signal 150 generated by processor and control element 130. As will be described the color control signal 140 is received by the processor and control element 130 and, as indicated by the dashed lines, may be provided to processor and control element 130 from a source outside the display device 110 or within display device 110, such as a video signal internal to the display device.

The system 100 is operable to dynamically control backlighting of the display device 110. The display device has the light-transmissive bezel 120, which is operable to display an image, and is located in an environment, such as a room, car, or other space. In response to backlighting control signal 150 from the processor and control element 130, the backlighting element 160 is operable to illuminate the light-transmissive bezel with a backlighting color. The backlighting control signal generated by the processor and control element and received by the backlighting element to control generation of the backlighting color is determined by the color control signal 140 received by the processor and control element 130 of the display device.

The backlighting element 160 may be a variety of different types of light sources. Given the availability of inexpensive light emitting diodes (LEDs), in three primary colors of red, blue and green, LEDs are a good source of backlighting for the bezel. A transparent light display may be achieved with an integral light diffuser, such as LEDs behind the diffuser. A translucent neutral grey bezel color may be achieved, thereby eliminating a need for the diffuser. Light piping may be used to merely illuminate the edges of the bezel, thereby providing a less costly method to illuminate the bezel. Leaky light pipe fibers may be used to bleed light behind a translucent bezel. Varying current to each of the primary color LEDs makes it possible to generate an arbitrarily large palette of colors. The color of the backlighting of the bezel, then, can be accomplished via the backlighting control signal 150 provided to backlighting element 160. As will be described, control of the backlighting color for the bezel is accomplished by color control signal, which may be provided by a sensor device capable of sensing a color of an environmental feature of the environment in which the display device is situated, such as a wall or ceiling color, or by a remote controller device, controlled by a user via a user interface.

Figure 2:
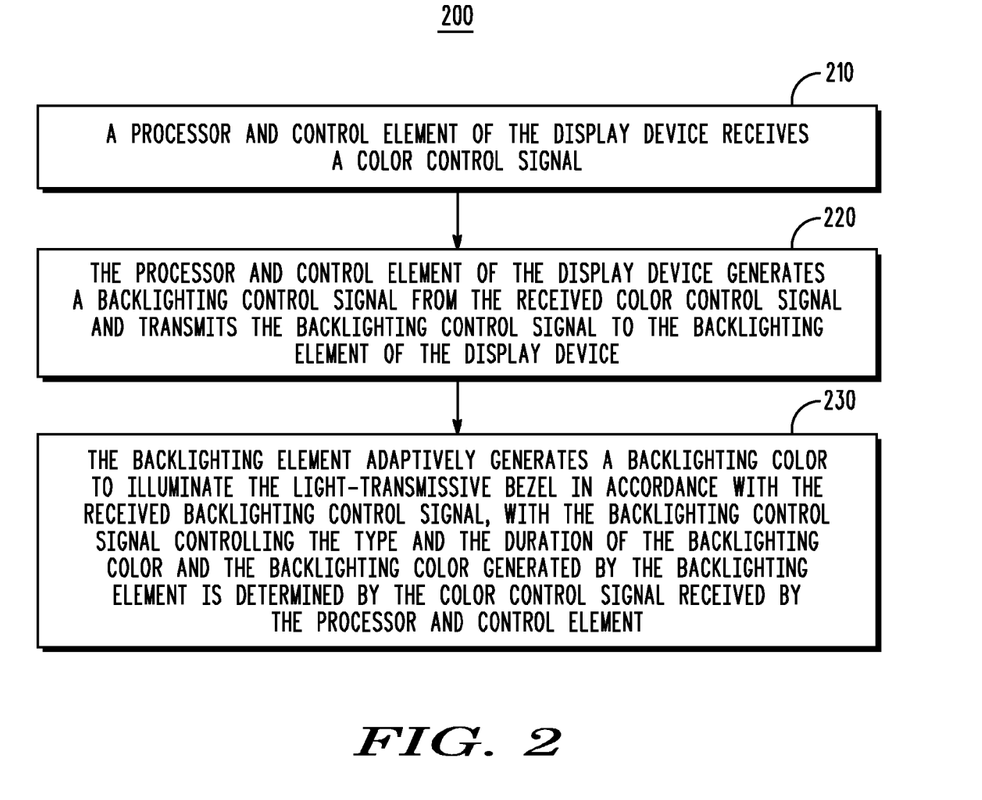
FIG. 2 is a flowchart illustrating generation of a color control signal to effect desired backlighting color(s) of a light-transmissive bezel, in accordance with various embodiments.

Referring now to FIG. 2, flowchart 200 illustrates an overall flow in accordance with certain embodiments. At Block 210, a processor and control element of the display device receives a color control signal. At Block 220, the processor and control element of the display device generate a backlighting control signal from the received color control signal and transmit the backlighting control signal to the backlighting element of the display device. The backlighting element adaptively generates a backlighting color to illuminate the light-transmissive bezel in accordance with the received backlighting control signal, with backlighting control signal controlling the duration of the backlighting color and the backlighting color generated by the backlighting element is determined by the color control signal received by the processor and control element, at Block 230. As described above, the use of LEDs allows the backlighting color to be dynamically changed as desired by simply varying the current provided to each LED. Other lighting sources, the color and duration of color, may also be controlled as desired.

Thus, the duration and color of the backlighting color achieved to illuminate the bezel may be controlled by the color control signal received by the display device. With regard to the duration of a particular color, the color control signal may cause the backlighting color produced by the backlighting element to change periodically, in a random fashion or in accordance with predefined colors selected by a software program. Or the duration of the backlighting color produced by the backlighting element may change in response to certain factors such as the color of an environmental feature, such as a wall or ceiling near which the display device resides; the time of the day (a light color for morning versus a dark color for the evening, or a blue during mid-day and a reddish color in the evening to match a sunset) or the season of the year (an orange color for the Fall, for example); the ambient temperature of the outside (such as white or blue for Winter; orange or yellow for the Summer); the occurrence of special events, such as holidays like Halloween (orange or green bezel) and national holidays (the bezel backlighting could rotate through the colors in the flag) and weddings (white or silver, for example); or the primary display color of an image being displayed by the display device. If the image being displayed is an image that changes with some frequency, i.e. a streaming video or television programming, the backlighting color produced to illuminate the bezel may correspondingly change frequently to complement the primary color of the image then being displayed.

It is recognized that the color control signal may changed to cause certain backlighting colors and durations thereof to occur in accordance with a software or firmware programming. Such programming may reside in the display device itself, such as within the processor and control element, or it may reside externally, such as part of a user interface by which a user may control the backlighting color. User interfaces, including graphical user interfaces (GUI), of a remote control device or of a sensor device, such as a PDA or a digital camera, are envisioned to contain programming enabling a user to control the backlighting color generated, via the color control signal.

As previously discussed, the color control signal may be generated in response to the color of an environmental feature of the environment in which the display device resides. This is illustrated in the system and flow of FIGS. 3-5. Referring now to system 300 of FIG. 3, a functional block diagram in accordance with various embodiments is shown. Display device 310 has light-transmissive bezel 320 around its perimeter and a processor and control element 330 that, in response to a color control signal 340, generates backlighting control signal 355 to cause backlighting element 360 to generate the backlighting color specified in the color control signal 340. Display device 310 receives color control signal 340 from a sensor 350 as shown. The sensor is operable to sense color of an environmental feature of the environment in which the display device resides, such as a wall 370 on which the display device hangs or an adjacent ceiling 380. The color control signal 340 is determined by or from the color sensed by the sensor. This may allow the color control signal and/or the backlighting control signal generated from the color control signal to adaptively change in response to changes in the color of the environmental feature. The processor and control element 330 generates the backlighting control signal 355 in response to the sensed color of the environmental feature.

Figure 3:
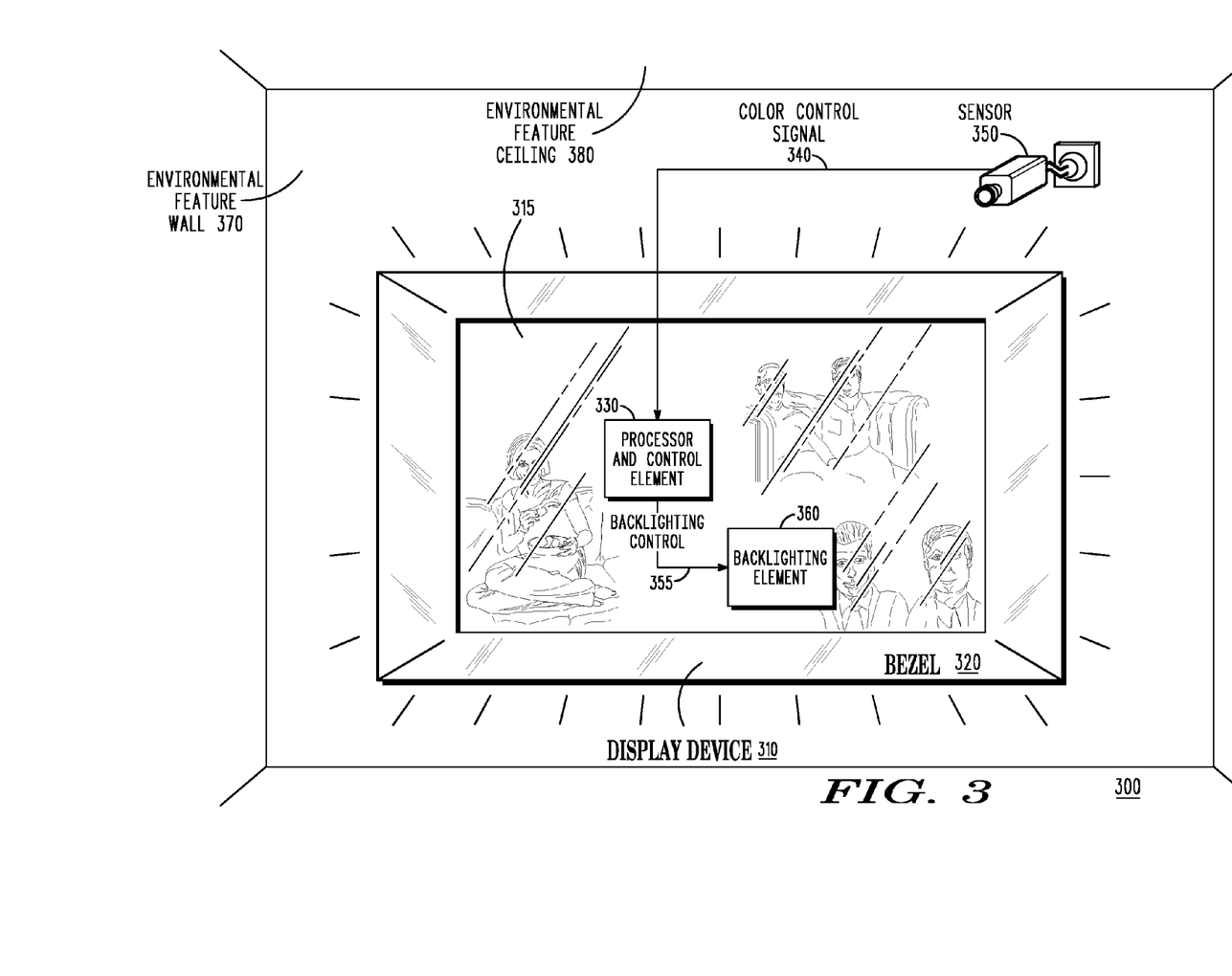
FIG. 3 is a functional block diagram of a display device system capable of sensing a color of an environmental feature, in accordance with various embodiments.

The sensor may be a digital camera operable to sense the color of the environmental feature, such as a wall on which the display device is mounted or a ceiling adjacent the display device. A digital camera is able to easily sense and record various colors. This color information of an environmental feature may be readily transmitted to the processor and control element of the display device. And, it is noted that if the manufacturer of the digital camera and the display device are programmed to recognize colors in the same fashion, such as the same color representation, the display device will be able to readily ascertain the exact color being supplied it by the digital camera.

The processor and control element adaptively controls the backlighting element to generate the backlighting color in response to the sensed color of the environmental feature. The backlighting color generated by the backlighting element may approximate the sensed color of the environmental feature. Or, the backlighting color generated may be chosen to maximize or minimize contrast between the backlighting color and the sensed color of the environmental feature. For example, a sensed color of white on the walls may cause a backlighting color of black, in order to maximize contrast between the bezel and the wall. Or, consider a viewing environment in which a flat-screen TV having a green bezel is mounted on a white wall and the active, image color being displayed is primarily orange; this would be quite an irritating color combination for many people. The user can create a color control signal that will change the backlighting color of the light-transmissive bezel to grey, yielding a much more pleasing color combination.

Figure 4:
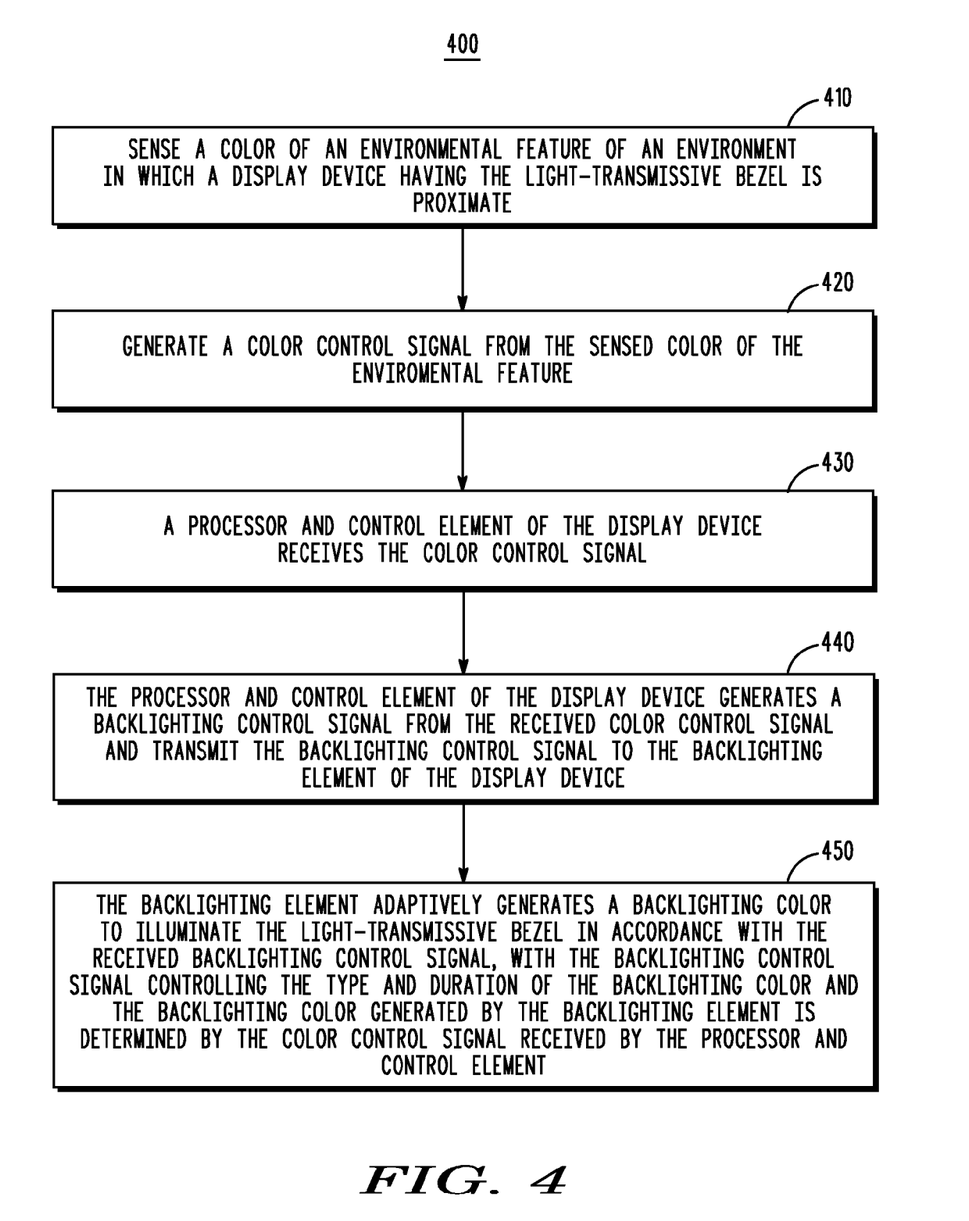
FIGS. 4-5 are flowcharts illustrating generation of a color control signal taking into account a sensed color of an environmental feature, in accordance with various embodiments.

Referring now to FIG. 4, flowchart 400 illustrates a flow taking into account sensing a color of an environmental feature, in accordance with various embodiments. At Block 410, a color of an environmental feature of an environment in which a display device having the light-transmissive bezel is proximate is sensed. At Block 420, a color control signal is generated from the sensed color of the environmental feature; as previously described the color control signal may be chosen to cause the backlighting color the same as (approximate) or to contrast with the sensed environmental feature color. This color control signal is received by the processor and control element of the display device receives the color control signal at Block 430; again, it is noted that particularly in the case where the backlighting color is to contrast with or otherwise be different from the sensed environmental color processing of the sensed color to generate the desired backlighting control signal 355 may be accomplished by the processor and control element 220 or it may be done elsewhere, such as within software or firmware of the sensor device having the sensor (like a digital camera), perhaps in response to user control via a user interface of the sensor device.

The processor and control element of the display device generates a backlighting control signal from the received color control signal and transmits the backlighting control signal to the backlighting element of the display device at Block 440. At Block 450, the backlighting element adaptively generates a backlighting color to illuminate the light-transmissive bezel in accordance with the received backlighting control signal, with the backlighting control signal controlling the duration of the backlighting color and the backlighting color and wherein the backlighting color generated by the backlighting element is determined by the color control signal received by the processor and control element.

The color control signal may be determined not only from a sensed environmental color but also from the color of an image being displayed by the display screen 315 of display device 310. In this case, the system is operable to dynamically control backlighting of the display device that displays an image characterized by a primary display color, taking into account the primary display color of the image when determining the color control signal. This occurs by the processor and control element of the system monitoring the image to detect the primary display color of the image displayed on the display screen of the display device. The primary display color may be the dominate color on the display, as determined by processing of the image signal by the processor and control element. The processor and control element can adaptively control the backlighting element to generate the backlighting color in response to the sensed color of the environmental feature and to the sensed primary display color of the image. The processor and control element may detect the primary display color of the image by monitoring a video signal displayed by the display screen of the display device.

The primary display color of an image may be determined in various ways. On approach is to look at all the pixel data associated with an image, or, alternately, to look at the color component portions, i.e. Cb or Cr, since the Y information only conveys luma information. Also, looking at the color data or even all the pixel data before upscaling or converting to RGB or the 4:4:4 color sampling space would reduce the amount of data that would have to be averaged. Many video sources are not 4:45:4 nor 4:2:2 but only 4:2:0, such as DVDs. Also, the most important video information may be considered to be in the center of the screen, thereby making weighting of center color data a desirable approach. Moreover, processing simplification of color data may be accomplished by recognizing that color at the lateral side, border areas of the display area or below the set, as might be hidden by an AV cabinet or TV stand. Also, a recognition that human vision focuses more on and makes more visible the sides (nearest the wall) of the image than at the very top of an image.

Knowing the primary display color of the image being displayed permits the backlighting color of the bezel to be controlled in a meaningful way. For example, the processor and control element may adaptively control the backlighting element to generate the backlighting color so as to maximize contrast with the sensed primary display color. The processor and control element can adaptively control the backlighting element to generate the backlighting color to minimize contrast with the sensed primary display color. Or, the processor and control element adaptively controls the backlighting element to generate the backlighting color to maximize contrast between the sensed primary display color and the sensed color of the environmental feature. Further, the processor and control element may adaptively control the backlighting element to generate the backlighting color to minimize contrast between the sensed primary display color and the sensed color of the environmental feature.

Figure 5:
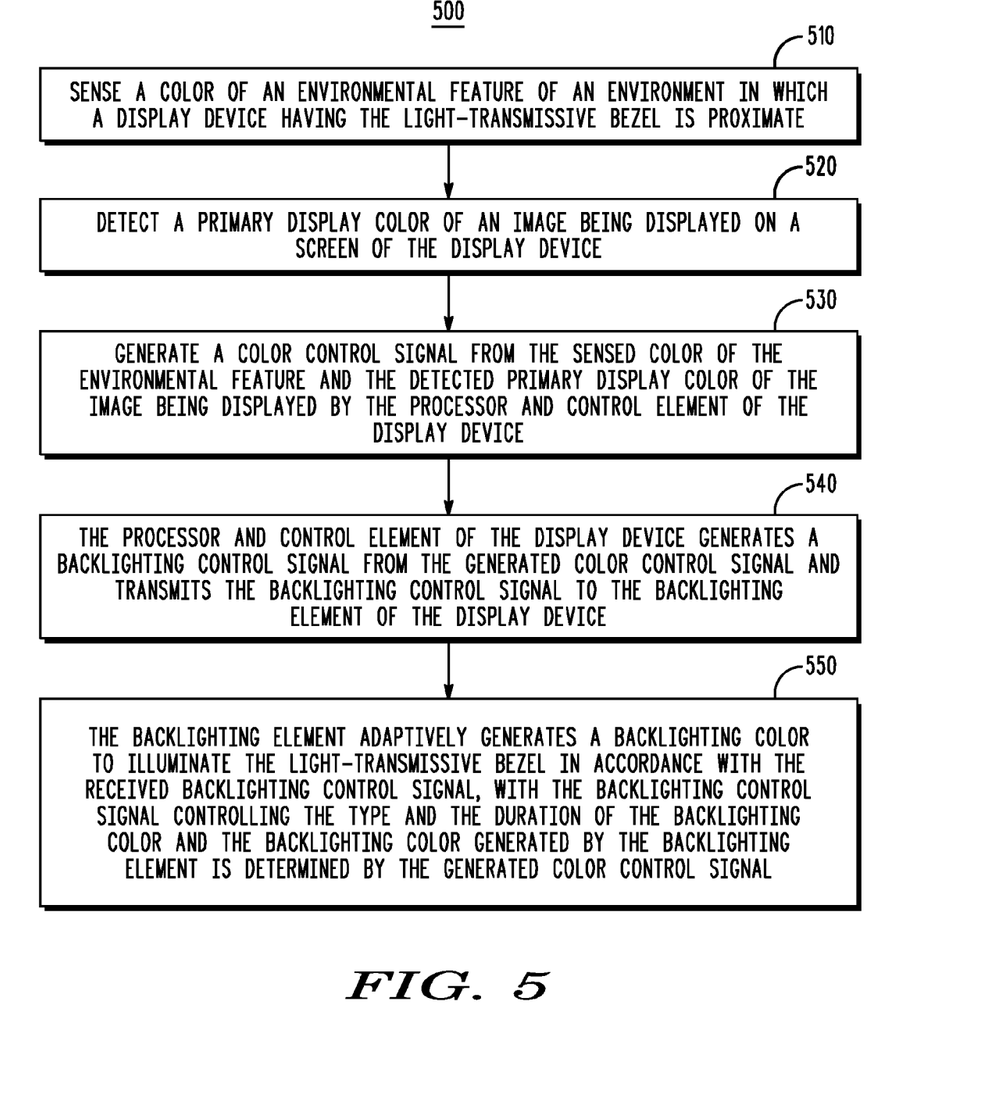

Referring now to FIG. 5, flowchart 500 illustrates a flow incorporating sensing environmental color and the primary display color of a displayed image, in accordance with various embodiments. At Block 510, a color of an environmental feature of an environment in which a display device is proximate is sensed. The color may be sensed by a sensor, such as a digital camera, as discussed above. At Block 520, a primary display color of an image displayed on a display screen of the display device is detected; as discussed above, the primary display color may be detected by monitoring a video signal used to display the image. Detection of the primary display color may be performed by the processor and control element internal to the display device. A color control signal is determined or generated from the sensed color of the environmental feature and the detected primary display color of the image displayed by the processor and control element of the display device at Block 530. Since, as noted above, the primary display color may be detected by the processor and control element, the processor and control element may generate the color control signal from the detected primary display color and the sensed environmental color. As indicated by the dashed color control signal line of FIG. 1, then, this signal may be determined internally or externally from the display device. The algorithm, software, firmware or program instructions to determine the color control signal from these two color signals may reside within the display device or be within a remote controller, in the example of a user determining what the color control signal should be given the two signals. As discussed at length above, the color control signal may be selected to cause the backlighting color of the bezel to approximate either of the two colors, contrast with either of the two colors, to be some type of average of the two colors or to otherwise be derived from a consideration of the two colors.

At Block 540, the processor and control element of the display device generates a backlighting control signal from the generated color control signal and transmits the backlighting control signal to the backlighting element of the display device. Then, at Block 550, the backlighting element adaptively generates a backlighting color to illuminate the light-transmissive bezel in accordance with the received backlighting control signal, with backlighting control signal controlling the type and the duration of the backlighting color and the backlighting color generated by the backlighting element is determined by the generated color control signal.

The use of a remote controller device, such as a remote control, a remote controller, a remote commander or the like, provides a way by which a user may interact with a user interface, such as a GUI, to effect the backlighting color that will illuminate the bezel of the display device. As shown in system 600 of FIG. 6, display device 610 has a light-transmissive bezel 620, a display screen 615 for displaying an image, a transceiver 630 capable of sending and receiving signals from remote control device 660, a processor and control element 640 and backlighting element 650. In response to a user interacting with user interface 665 of the remote control device 660, the color control signal 670 is received by the processor and control element 640 from transceiver 630; processor and control element 640 generates backlighting control signal 645, causing the backlighting element 650 to generate a backlight color as controlled by color control signal 670. In response to the transceiver element receiving a color control signal from the remote control device, the processor and control element adaptively controls the backlighting element to generate the backlighting color of the light-transmissive bezel defined by the color control signal from the remote control device.

Figure 6:
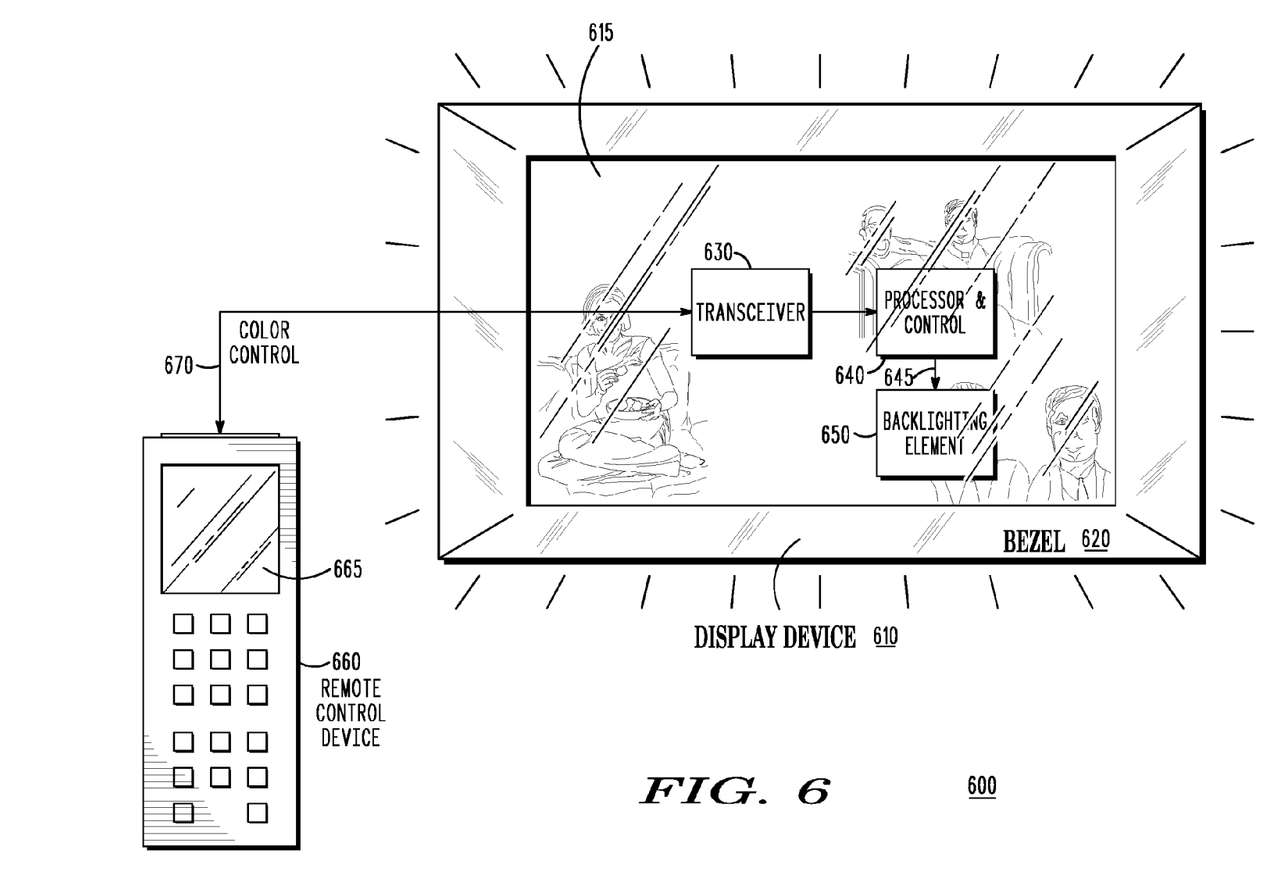
FIG. 6 is a functional block diagram of a display device system having a user interface by which a user may determine a color control signal used to generate backlighting color for a light-transmissive bezel of a display device, in accordance with various embodiments.

The remote control device 660 is useful for remote control of an electronic device such as television, control peripheral devices coupled to the television set (such as video cassette recorders, video disk players and audio equipment), a personal digital assistant (PDA), a cellular or mobile phone, portable media players or the like, has a user interface through which a user may remotely control operation of these electronic device(s). The communications link between the remote controller 660 and the display device 610 is a bi-directional, two-way link during a normal operating mode of operation.

The user interface 665 of remote control device 660 allows a user to send and receive information, via the remote controller, to the display device. The display of the user interface 665 may be, for example, a liquid crystal display (LCD), on which data and information received from the display device or input using a keypad may be displayed. For example, in the case of a television as the display device, the user interface

665 may display a menu or program guide. Such information can assist a viewer in navigating among the wide variety of available programming. For example, electronic program guides that are displayed on a particular channel are common in cable and satellite systems as a way of informing viewers as to what programming is being shown. The user interface also features a plurality of keys or buttons, shown, by which a user can enter instructions to be processed by a processor and control element of the remote control device to generate the color control signal 670.

With regard to the color of an environmental feature, such as the color of a wall, it is possible for a viewer to enter the room color data into the display device (such as a television) via a user interface menu of a remote controller, a panel at the display device itself, or a user interface of another system device, such as a sensor device. The display device can then go through its internal database or access a paint color database via an Internet connection. Most people paint or repaint their rooms, and many may have the can of paint with the color information available to be input as room color data into the user interface.

In the case of controlling the backlighting color of the bezel, a user may access a user interface menu and then choose an option, such as initial set-up or the like, to set the desired bezel setting. Available to the user may be a large number of available color, or option to: choose a backlighting color that is opposite that of the color of the wall or other environmental feature; choose a backlighting color that is approximately equal to that of the color of the wall or other environmental feature (this option would rely upon the sensed color of the environmental feature discussed above). Again, access to a user interface by a user may occur by interaction with a user interface of a remote control device or by another user interface of the system, such as a user interface of the display device itself or a user interface of a sensor device, like the digital camera of FIG. 3.

Communication between the display device 610 and the remote controller 660 may be any appropriate type of signaling. For example, infra-red (IR), radio-frequency (RF), ultrasonic signaling, or combinations thereof are all acceptable and equivalent methods of transmitting data. As mentioned, during normal operation, there is a two-way communications link.

Figure 7:
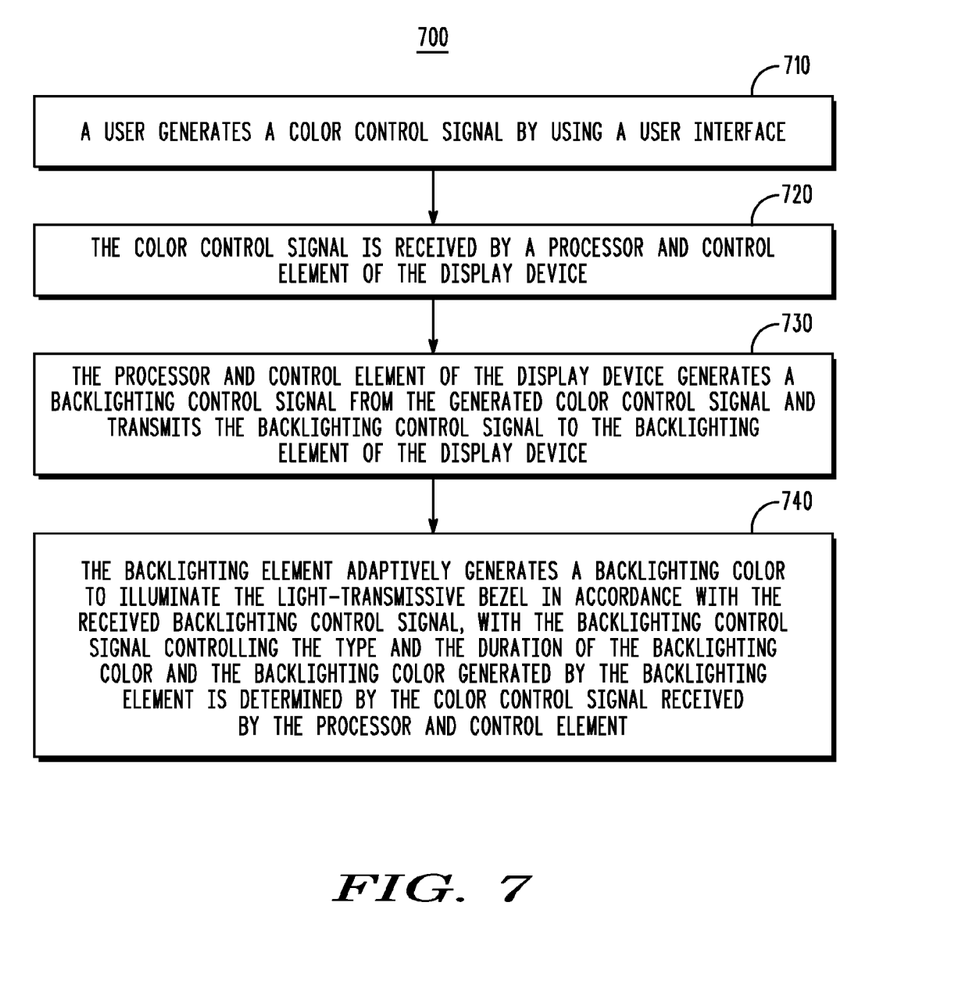
FIG. 7 is a flow chart illustrating generation of a color control signal by a user interface, in accordance with various embodiments.

Referring now to FIG. 7, flowchart 700 illustrates a flow taking into account use of a user interface by a user to affect the color control signal. At Block 710, a user generates a color control signal by using a user interface; as described above the user interface may be of a remote control device or it may be of another type device, including the display device itself. The programming instructions for processing input instructions made by the user in the user interface may reside various places within the system. For example, in the instance of a remote controller GUI, the software may reside with the remote control device. Conversely, interaction of a user with a user interface of the display device may occur at the display device, where the program instructions may reside. At Block 720, the color control signal is received by a processor and control element of the display device. The processor and control element of the display device generates a backlighting control signal from the received color control signal and transmits the backlighting control signal to the backlighting element of the display device at Block 730. At Block 740, the backlighting element adaptively generates a backlighting color to illuminate the light-transmissive bezel in accordance with the received backlighting control signal, with backlighting control signal controlling the type and the duration of the backlighting color and the backlighting color generated by the backlighting element is determined by the color control signal received by the processor and control element.

It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a receiver, a transceiver, a radio, signal drivers, clock circuits, power source circuits, and user input devices. As such, these functions may be interpreted as a method to perform functions in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Those skilled in the art will recognize that exemplary embodiments of the present invention may be based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using various forms of storage, such as, for example, Read Only Memory (ROM) devices, Random Access Memory (RAM) devices, disk storage, optical storage elements, magnetic storage elements, magneto-optical storage elements, flash memory, and/or other equivalent storage technologies without departing from the present invention. Such alternative storage devices should be considered equivalents.

Various embodiments described herein are implemented using programmed processors executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A system operable to dynamically control backlighting of a display device, the system comprising:
    the display device having a light-transmissive bezel, wherein the display device is operable to display an image and the display device is located in an environment, the display device further comprising:
        a processor and a control element operable to receive a color control signal; and
        a backlighting element operable to illuminate the light-transmissive bezel with a backlighting color in response to a backlighting control signal generated by the processor and the control element, and
    a sensor operable to sense a color of an environmental feature of the environment, wherein a user interface of the sensor is operable to receive, from a user, a color data associated with the color of the environmental feature, wherein the color control signal is determined by the received color data,
    wherein the display device accesses a color database to retrieve information associated with the color data, wherein the backlighting control signal is generated from the color control signal based on the retrieved information, and
    wherein the processor and the control element is operable to adaptively control the backlighting color.

2. The system of claim 1, wherein the color control signal and the backlighting control signal adaptively change in response to change in the color of the environmental feature.

3. The system of claim 1, further comprising:
    a remote control device having a user interface by which the user can control operation of the display device and generation of the backlighting control signal; and
    the display device further comprising a transceiver element operable to receive and transmit signals between the remote control device and the display device, wherein the color control signal is received by the transceiver element from the remote control device and used by the processor and the control element to generate the backlighting control signal.

4. The system of claim 1, wherein the image displayed by the display device is characterized by a primary display color and the color control signal is determined by the processor and the control element from the primary display color and the color of the environmental feature.

5. The system of claim 4, wherein the color control signal and the backlighting control signal adaptively change in response to change in the color of the environmental feature and the primary display color.

6. The system of claim 4, wherein the processor and the control element are operable to adaptively control the backlighting color to maximize contrast between the backlighting color and the primary display color.

7. The system of claim 4, wherein the processor and the control element are operable to adaptively control the backlighting color to minimize contrast between the backlighting color and the primary display color.

8. The system of claim 4, wherein the processor and the control element is operable to adaptively control the backlighting color to maximize contrast between the primary display color and the color of the environmental feature.

9. The system of claim 4, wherein the processor and the control element are operable to adaptively control the backlighting color to minimize contrast between the primary display color and the color of the environmental feature.

10. The system of 4, wherein the primary display color of the image is detected from a video signal of the image.

11. The system of claim 10, wherein the video signal is monitored by the processor and the control element.

12. The system of claim 1, wherein the sensor is a digital camera located proximate the environmental feature.

13. A method of dynamically controlling backlighting of a light-transmissive bezel of a display device, comprising:
    receiving a color control signal, wherein the color control signal comprises a user entered color data, wherein the color data is associated with a color of an environmental feature of an environment in which the display device is proximate, wherein the display device accesses a color database to retrieve information associated with the color data;
    generating a backlighting control signal from the received color control signal based on the retrieved information; and
    generating a backlighting color to illuminate the light-transmissive bezel in accordance with the backlighting control signal, wherein the backlighting control signal adaptively controls a duration of the backlighting color.

14. The method of claim 13, further comprising:
    detecting a primary display color of an image displayed on a display screen of the display device;
    generating the color control signal from a sensed color of the environmental feature and the detected primary display color; and
    adaptively controlling the backlighting color of the light-transmissive bezel in response to the color control signal generated from the sensed color and the detected primary color.

15. The method of claim 14, wherein detecting the primary display color is accomplished by monitoring a video signal displayed by the display screen.

16. The method of claim 14, further comprising adaptively controlling the backlighting color to maximize contrast between the backlighting color and the detected primary display color.

17. The method of claim 14, further comprising adaptively controlling the backlighting color to minimize contrast between the backlighting color and the detected primary display color.

18. The method of claim 14, further comprising adaptively controlling the backlighting color to maximize contrast between the detected primary display color and the sensed color of the environmental feature.

19. The method of claim 14, further comprising adaptively controlling the backlighting color to minimize contrast between the detected primary display color and the sensed color of the environmental feature.

20. The method of claim 14, further comprising:
dynamically controlling the color control signal and the backlighting color of the light-transmissive bezel based on a user input provided via a user interface and the detected primary display color.

21. The method of claim 20, wherein the user interface is a remote controller operable to remotely control the backlighting color of the light-transmissive bezel.

22. The method of claim 20, wherein the user input is provided via a user interface of a sensing device.

23. The method of claim 22, wherein the sensing device senses the color of the environmental feature.

24. The method of claim 22, wherein the sensing device is a digital camera that senses the color of the environmental feature.

25. The method of claim 13, further comprising sensing the color of the environmental feature, wherein the sensing is performed by a sensor located proximate the environmental feature.

26. The method of claim 13, further comprising:
dynamically controlling the color control signal and the backlighting color of the light-transmissive bezel based on a user input provided via a user interface.

27. The method of claim 26, wherein the user interface is a remote controller operable to remotely control the backlighting color of the light-transmissive bezel.

28. The method of claim 26, wherein the user input is provided via a user interface of a sensing device.

29. The method of claim 28, wherein the sensing device senses the color of the environmental feature.

30. The method of claim 28, wherein the sensing device is a digital camera that senses the color of the environmental feature.

31. The method of claim 13, wherein the color database comprises one or both of: an internal database of the display device and/or a paint color database accessible via an Internet connection.

* * * * *